May 10, 1927.
W. K. HOWE
1,628,319
TRAIN CONTROL
Filed Nov. 27, 1925
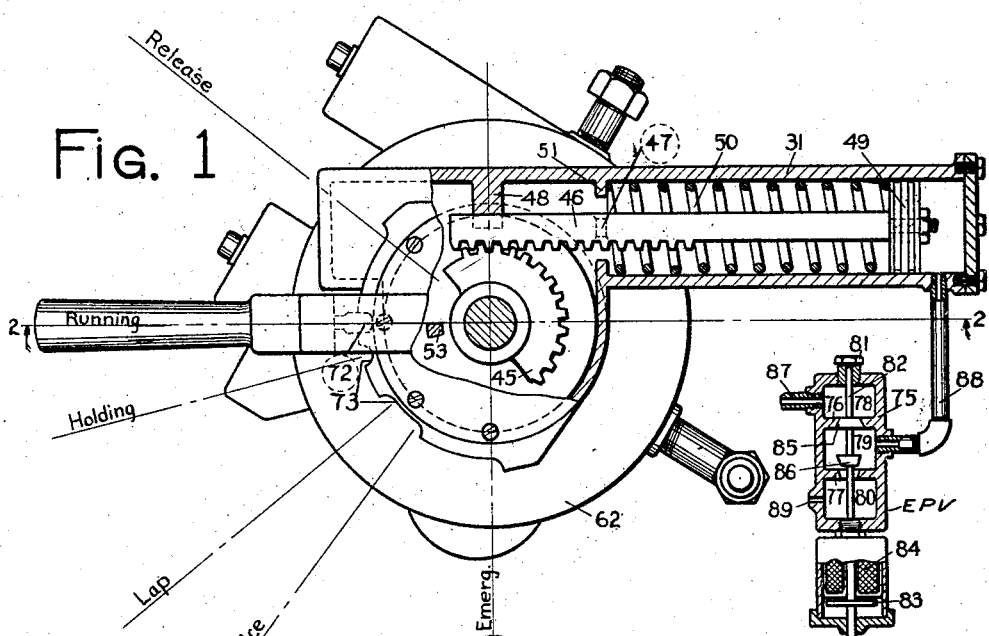
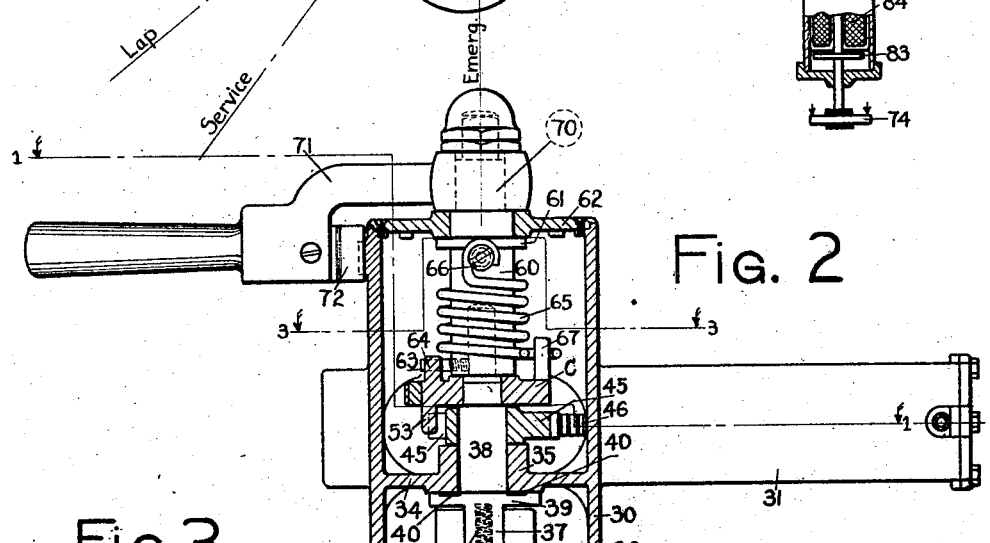
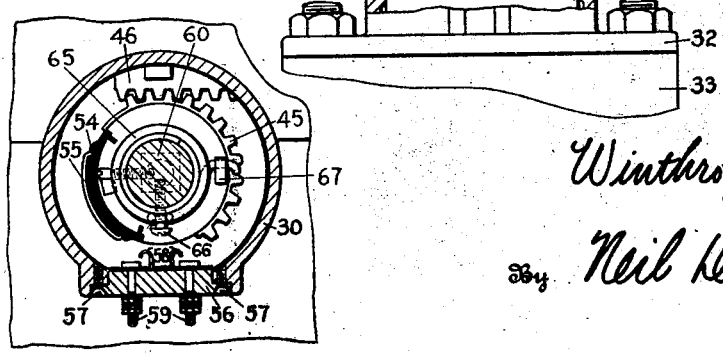
Inventor
Winthrop K. Howe,
By Neil D. Preston,
his Attorney Patented May 10, 1927.

1,628,319

UNITED STATES PATENT OFFICE.

WINTHROP K. HOWE, OF ROCHESTER, NEW YORK, ASSIGNOR TO GENERAL RAILWAY SIGNAL COMPANY, OF ROCHESTER, NEW YORK.

TRAIN CONTROL.

Original application filed October 7, 1922, Serial No. 593,073. Divided and this application filed November 27, 1925. Serial No. 71,670.

This invention relates to railway brake control apparatus, and more particularly to means for automatically operating the usual engineer's brake valve to a brake applying position in a manner so that the engineer cannot prevent its operation and without the necessity of using an operating force as great as that which may be exerted by the engineer.

In applying automatic devices for controlling the movement of trains in accordance with traffic and trackway conditions in advance, it is desirable, for well-known reasons, to use the regular air brake system already on the train; but difficulties are encountered in enforcing an automatic brake application with safety and in a manner so that it can not be forestalled by the engineer. In order to make a brake application by suitable automatic apparatus acting upon the usual air brake equipment, it is necessary to vent air from the brake pipe. Since, however, the engineer's brake valve when in its usual running position continually feeds air into the brake pipe through a feed valve, it is advisable to do more than merely open the brake pipe to atmosphere to cause a proper brake application, that is, a brake application which will not enable the triple valve located on the cars of the following train to move into emergency and apply the brakes so severely so as to endanger the railway equipment. In addition to the undesirable feature of the automatic air brake system which allows air to pass through the feed valve into the brake pipe under normal conditions, that is, with the brake valve in the running position, there is another problem to be taken into consideration, namely, the ability of the engineer to move the brake valve to the release position when an automatic brake application has occurred, and by so doing connect main reservoir pressure to the brake pipe for the purpose of partially or wholly preventing such an automatic brake application.

In accordance with the present invention it is proposed to modify the usual engineer's brake valve of the standard automatic airbrake system in a manner so that the rotary valve member thereof can be actuated to the service or emergency position by direct engagement of parts, but can not be moved to the release position by such direct engagement, but merely through the medium of an intervening initially tensioned spring, providing such movement is not opposed by a suitable automatic brake valve operator which is moving toward, or is holding this valve in the service brake applying position.

Further objects, purposes, and characteristic features of the invention will appear as the description thereof progresses.

In describing the invention in detail, reference will be made to the accompanying drawings, in which:—

Fig. 1 is a plan view of the usual engineer's brake valve provided with an automatic brake valve operator embodying the present invention, portions thereof being shown in section, and taken on the line 1—1 of Fig. 2;

Fig. 2 is a partial section taken on the line 2—2, Fig. 1, as viewed in the direction of the arrows; and Fig. 3 is a cross-section taken on the line 3—3 of Fig. 2.

This is a division of my prior application Ser. No. 593,073, filed Oct. 7, 1922.

Structure.

Referring to the drawings the automatic brake valve operator consists of a casing 30 provided with a tubular extension forming an air cylinder 31. This operator casing 30 is provided with a flange 32 corresponding to the flange of the usual engineer's valve cover plate, and is bolted to the casing 33 of the usual engineer's brake valve. This casing 30 is provided with a partition 34, having a flange 35 to form a bearing. The usual rotary valve 36 is shown extending into the casing 30, and is provided with a squared recess to receive the squared end 37 of the valve stem 38.

This valve stem 38 is provided with a recessed flange 39, in the recess of which is provided a packing ring 40. A compression coil spring 41 is provided in the counter-bore of the square portion 37 of the valve stem 38 and bears against the rotary valve 36 to lift the valve stem 38 up against the partition 34. The valve stem 38 is also forced upward by main reservoir pressure air, which is provided in the casing 30 below the partition 34 for urging the rotary valve 36 against its seat in the usual manner.

Rotatably mounted on the valve stem 38 is a gear sector 45, which is in operative engagement with a rack 46 guided by guides 47 and 48, and having its opposite end fastened to a piston 49 contained in the air cylinder 31. A compression coil spring 50 is provided between the piston 49 and the inwardly extending flange 51 of the air cylinder 31. This spring 50 normally maintains the sector 45 in its normal position as shown, but will be compressed to allow the rack 46 to operate the gear sector 45 in a counter-clockwise direction when pressure fluid is admitted to the air cylinder 31.

Directly above the sector 45 the valve stem 38 is provided with a squared portion on which is slidably but non-rotatably fitted a valve stem collar C, which is provided with a downwardly extending lug 53 which is adapted to be engaged by the edge of the sector 45 when this sector is rotated in a counter-clockwise direction. This valve stem collar C is provided with a sector of insulation 54, having a contact segment 55 suitably fastened thereto (see Fig. 3). The casing 30 is provided with an insulated terminal board 56 fastened thereto by screws 57, and having resilient contact fingers 58 fastened under the heads of binding posts 59. The relation of the contact segment 55 to that of the contact fingers 58 is such that these contact fingers will be bridged by the segment only if the valve stem collar and rotary valve 36 are in a brake applying position either service or emergency, or both.

The valve stem 38 is provided with a cylindrical extension on which is pivotally journaled a handle stem 60, and this handle stem is provided with a flange 61 bearing under the cover 62 screw fastened against the casing 30. This handle stem 60 is provided with a radially extending screw pin 63, which is urged against an upstanding lug 64 on the valve stem collar C by the action of a coil spring 65, this spring having its one end fastened to the handle stem 60 by a screw 66, and having its other end hooked around the curved lug 67 extending from the collar C. It will thus be noted that counter-clockwise rotation of the handle stem 60 causes positive engagement between the screw pin 63 and the lug 64, whereas clockwise rotation of the handle stem 60 provides an operative connection able to transmit a torque equal to the initial tension of this spring 65 only. The portion 70 of the handle stem 60 extending from the casing is squared, and provided with the usual air brake valve operating handle 71 which is provided with a spring latch 72 adapted to engage suitable notches 73 corresponding to the running, holding, lap and service positions of this handle respectively.

The flow of air pressure to the air cylinder 31 is controlled by an electrically operated pneumatic valve designated EPV. This valve EPV comprises a casing 75, having partitions 76 and 77 to form compartments 78, 79 and 80 respectively. The top wall of the EPV is provided with a threaded opening in which is contained a screw plug 81 which slidably supports the end of a valve stem 82, having an armature 83 fastened to the lower end thereof and adapted to be held in its upper and normal position by a coil 84. This valve stem 82 is provided with valves 85 and 86 adapted to rest on valve seats in the partitions 76 and 77 respectively, the valve 85 being closed when the coil 84 is energized and the valve 86 being closed when this coil is de-energized. The compartment 78 is connected to the main reservoir of the usual air brake system by a pipe 87, whereas the chamber 79 is connected to the air cylinder 31 by a pipe 88, and the chamber 80 is connected to atmosphere through the opening 89. It is thus readily apparent that the air cylinder 31 will be connected to atmosphere when the coil 84 is energized, but will be connected to main reservoir pressure when this coil 84 is de-energized.

For purposes explained in the parent application, the electro-pneumatic valve EPV is provided with stick contacts, comprising an insulated disk 74 fixed to the stem 82 and engaging insulated stationary contacts, shown as arrows, while the magnet of said valve is energized.

*Operation.*

Let us assume that the coil 84 of the EPV has been automatically de-energized to effect an automatic service application. This de-energization of the coil may be effected by any suitable train control means, such, for instance, as described in the parent application. Under this condition, main reservoir pressure will flow through pipe 87, chambers 78 and 79, through pipe 88 into the air cylinder 31, thereby compressing spring 50 and operating the sector 45 in a counter-clockwise direction.

Assuming that the brake valve is at this time in its normal running position as shown, the initial or first part of the movement of the gear sector 45 will do nothing toward operating the valve. After this initial movement, the edge of the gear sector 45 will engage the downwardly extending lug 53 on the collar C, thereby carrying this collar C, the valve stem 38 and the rotary valve 36 to the service brake applying position of this valve, the rack 46 being limited from movement by striking the wall of the casing 30. It will be noted that this movement of the collar C will further tension the spring 65 if the handle 71 will not follow the movement of the collar C. It is contemplated, however, that the initial tension of this spring 65 shall be sufficient so that an automatic operation of the collar C will cause this spring to carry the handle 71 with it to the service position, but will not be strong enough so that if the engineer either holds the handle or moves it to the release position that this spring will prevent the movement of the rotary valve 36 to the service brake applying position by the automatic apparatus.

Assume now that the engineer has not held the handle 71, and that it has been moved to the service position, so that the spring latch 72 engages the service notch. Assume further that the train has been brought to a safe speed, and that the coil 84 is again energized by the automatic train control equipment. The energization of the coil 84 cuts off main reservoir pressure from the air cylinder 31, and connects this cylinder to atmosphere through port 89. The release of pressure from the air cylinder 31 allows the spring 50 to move the rack 46 and gear sector 45 back to their original and normal position. The rotary valve 36 will, however, not be returned because there is no mechanical connection between the sector 45 and the collar C for clockwise rotation of this sector 45. If the engineer now wishes to release the brakes, he may do so by moving the brake handle to the release position and then to the running position, in the usual manner.

Let us assume now that an automatic service brake application has been effected, as just explained, and that the engineer desires to do still more toward stopping the train. This may be done by operating the brake valve handle 71 to the emergency position, there being no interference between the collar C and the gear sector 45 for counterclockwise rotation of this collar C. After such a brake application, the brakes may again be released manually in the same manner as heretofore, as soon as the coil 84 is again energized.

Having thus shown and described only a single embodiment of the present invention, and having illustrated and described this embodiment rather specifically it is desired to be understood that this has been done for the purpose of clearly disclosing the invention and without illustrating the scope of the invention or the exact apparatus preferably employed in practicing the same, and that various changes, modifications and additions may be made to adapt the invention to the particular train control system in connection with which it is to be used as well as the particular air brake system to which it is to be applied, all without departing from the scope of the invention or the idea of means underlying the same.

What I claim is:—

1. In a braking system, the combination with an engineer's brake valve having a rotary valve therein; mechanism including a handle for operating said rotary valve to the release, the running and the brake applying position; automatic means for operating said rotary valve; said mechanism being constructed so as not to permit said rotary valve to be moved toward the release position manually when it is automatically operated even though the force produced by the automatic means is less than that exertable by the engineer, and circuit closing means closed when said valve is in a brake applying position.

2. In a combined manual and automatic brake valve, the combination with the usual rotary valve of an engineer's brake valve, of manually operable means which if actuated toward a brake applying position will operate the rotary valve by direct engagement of parts and which if actuated toward the release position will actuate said valve to such release position through an intervening spring, and automatic means for actuating said rotary valve to a brake applying position.

3. Brake applying apparatus for automatic air brake systems of the type in which a brake pipe is normally charged and in which if the brake pipe pressure is reduced an automatic brake application occurs, the combination with an equalizing reservoir normally charged to brake pipe pressure, and an equalizing discharge piston valve constructed and arranged to vent the brake pipe to atmosphere when the pressure in the brake pipe is higher than the pressure in the equalizing reservoir, said mechanism being constructed so as not to permit said rotary valve to be removed to the release position when said automatic means is operated in spite of movement of said handle to the release position and contacts closed only when said valve is in a brake applying position.

4. An engineer's brake valve comprising, a rotary valve, manually operable means mechanically connected to said rotary valve for operating said valve to a brake applying position by direct engagement of parts and for operating it in the opposite direction through the medium of a spring, and automatic means for operating said valve to a brake applying position in opposition to said spring even though said manually operable means is simultaneously operated in the opposite direction.

5. An engineer's brake valve comprising, a rotary valve, manually operable means mechanically connected to said rotary valve for operating said valve to a brake applying position by direct engagement of parts and for operating it in the opposite direction through the medium of a spring, and automatic means for operating said valve to a brake applying position in opposition to said spring if said manually operable means is at this time operated in the opposite direction, said spring being strong enough to cause the manually operable means to be moved to the brake applying position when said rotary valve is moved to this position automatically.

6. An engineer's brake valve comprising, a rotary valve, manually operable means mechanically connected to said rotary valve for operating said valve to a brake applying position by direct engagement of parts and for operating it in the opposite direction through the medium of a spring, and automatic means for operating said valve to a brake applying position, said automatic means exerting an operating force of a value to move said rotary valve to the brake applying position even though the manually operable means is held in the release position, and said spring being strong enough to operate the rotary valve to the release position when the automatic means is in its inactive condition and being strong enough to cause the manually operable means to move with the rotary valve to a brake applying position when the automatic means operates said rotary valve to such brake applying position.

7. An engineer's brake valve comprising, a rotary valve, manually operable means mechanically connected to said rotary valve for operating said valve to a brake applying position by direct engagement of parts and for operating it in the opposite direction through the medium of a spring, said manually operable means including a retaining latch retaining the same in the running position, automatic means for operating said valve to a brake applying position, said automatic means exerting an operating force of a value to move said rotary valve to the brake applying position even though the manually operable means is held in the release position, and said spring being strong enough to operate the rotary valve to the release position when the automatic means is in its inactive condition and the manually operable means is moved to the release position, and said spring being strong enough to cause the manually operable means to move with the rotary valve to the brake applying position when the automatic means operates said rotary valve to the brake applying position in spite of the retaining action of said retaining latch.

8. In a brake applying apparatus, the combination with the usual engineer's brake valve including the usual rotary valve, a handle, rigid means connecting said handle and rotary valve for operating said rotary valve to a brake applying position, and yieldable means for connecting said handle to said rotary valve for operation of said valve by a limited force only toward a brake releasing position.

9. In a combined manual or automatic brake valve, the combination with the usual rotary valve of an engineer's brake valve, manually operable means which if actuated toward a brake applying position will operate the rotary valve by direct engagement of parts and which if actuated toward the release position will exert a limited force only for actuating said valve toward such releasing position.

10. In a combined manual or automatic brake valve, the combination with the usual rotary valve of an engineer's brake valve, manually operable means which if actuated toward a brake applying position will operate the rotary valve by direct engagement of parts and which if actuated toward the release position will exert a limited force only for actuating said valve toward such releasing position, a gear sector which if moved in one direction about its center will engage said rotary valve to move it to a brake applying position, a rack for driving said gear sector, a piston contained in a cylinder for operating said rack, and automatic means for controlling the fluid pressure in said cylinder acting on said piston.

11. An engineer's brake valve for controlling the usual pneumatic brakes of railway trains comprising, the usual engineer's brake valve casing, a rotary valve in said casing a housing bolted on top of said casing, a handle projecting from said housing for operating said rotary valve, an insulating ring in said housing supporting a contact segment and directly connected to said rotary valve, and contact fingers supported by said housing but insulating therefrom and adapted to cooperate with said contact segment.

In testimony whereof I affix my signature.

WINTHROP K. HOWE.